Sept. 29, 1964     E. M. BRIGHT     3,150,792
REINFORCED PLASTIC MOLDED ARTICLE AND METHOD FOR MAKING SAME
Filed May 1, 1958
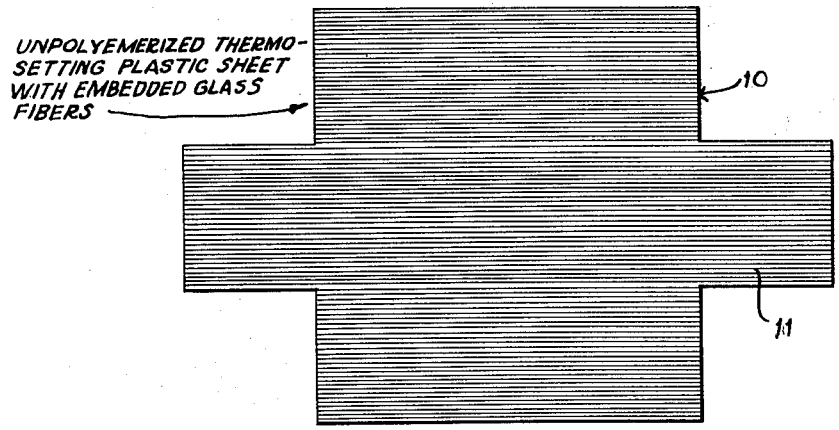
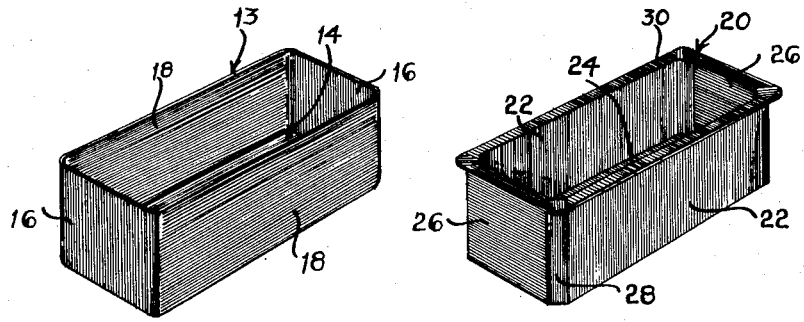
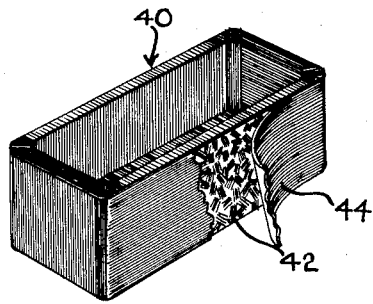
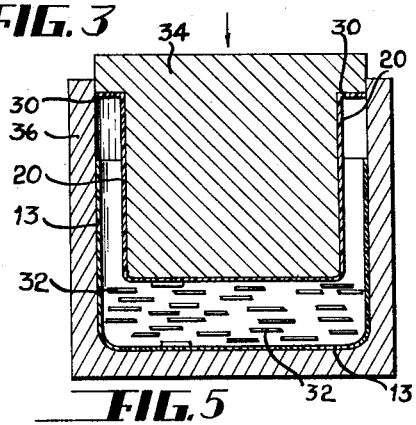
INVENTOR.
ELVIN M. BRIGHT
BY
HIS ATTORNEYS

United States Patent Office 3,150,792
Patented Sept. 29, 1964

3,150,792
REINFORCED PLASTIC MOLDED ARTICLE AND METHOD OF MAKING SAME
Elvin M. Bright, North Hollywood, Calif., assignor to Air Logistics Corporation, a corporation of Delaware
Filed May 1, 1958, Ser. No. 732,338
8 Claims. (Cl. 220—9)

This invention relates to a plastic article and to the method for making same, and more particularly to a method for making a plastic article from reinforced plastic sheet stock wherein the plastic article is provided with an encapsulating surface layer imparting directionalized reinforcement thereto. However, the invention is not necessarily so limited.

An object of this invention is to provide a molded plastic article which includes an inner body portion having substantially isotropic structural strength and an outer encapsulating layer bonded to the body portion having reinforcement in one or more preselected directions.

Another object of this invention is to provide a plastic article molded from plastic sheet stock reinforced with continuous substantially parallel glass fibers wherein the plastic article includes a body portion formed from the sheet stock in such a manner that the glass fibers of the body portion are randomly oriented to give the body portion substantially isotropic structural strength, and an encapsulating shell for said body portion formed from the sheet stock in such a manner that the parallel orientation of the glass fibers of the sheet is preserved. Such a plastic article may take the form of a light weight portable container, the body portion with its isotropic structural strength providing good compression strength for the container so that several like containers may be stacked one upon the other, and the outer encapsulating layer providing good tensile strength for the container so that the container with its contents may be lifted and carried from place to place.

Still another object of this invention is to provide a method for manufacturing a molded plastic article wherein the molded article includes a body portion of substantially isotropic structural strength and an outer encapsulating layer for said body portion having reinforcement in one or more directions.

Other objects and advantages reside in the construction of parts, the combination thereof, the method of manufacture and the mode of operation, as will become more apparent from the following description.

In the drawings,

FIGURE 1 is a plan view of a blank cut from glass fiber reinforced plastic sheet stock and used in the formation of the molded plastic article of this invention.

FIGURE 2 is a perspective view of a reinforcing shell for a container formed from the blank of FIGURE 1.

FIGURE 3 is a perspective view of an inner reinforcing shell for a container formed from a blank similar to that illustrated in FIGURE 1.

FIGURE 4 is a perspective view of a molded article embodying the reinforcing shells of FIGURES 2 and 3, wherein a portion of the outer reinforcing shell has been peeled away from the article to illustrate the inner structure of the article.

FIGURE 5 is a sectional view illustrating one step in the method by which the article of FIGURE 4 is made.

A recent development in the reinforced plastics field is the evolution of techniques for economically manufacturing substantially unpolymerized thermosetting or thermoplastic resin sheets reinforced with continuous parallel glass fibers. Methods for manufacturing such sheets, particularly from polyester and phenolic thermosetting resins, are disclosed in my copending application, Serial No. 732,320 filed May 1, 1958, and entitled Reinforced Plastic Sheets and the Method and Apparatus for Making Same, now Patent No. 3,053,717. These unpolymerized, glass fiber reinforced plastic sheets are pliable, substantially non-tacky, self-supporting sheets at room temperature, but will soften and become tacky upon application of heat even though the heat applied is insufficient to polymerize the plastic. As a consequence, such sheets may be conveniently formed to desired shapes, then polymerized to form plastic articles having varying degrees of reinforcement. The utility of such sheets in making reinforced plastic laminates and in contour molding is apparent.

In the present invention unpolymerized glass fiber reinforced plastic sheets, whether thermosetting or thermoplastic, are utilized in a novel manner to produce a new and improved molded plastic article.

Referring to the drawings in detail, FIGURE 1 illustrates a blank 10 cut from unpolymerized plastic sheet stock reinforced with continuous substantially parallel glass fibers, the reinforcing fibers being shown schematically at 11. The blank 10 is of such a shape that it may be formed into a shell 13, as appears in FIGURE 2, having a base 14, end walls 16, and side walls 18. The construction of the container-like shell 13 is such that the glass fiber reinforcement is continuous from one end wall 16 across the base 14 to the opposite end wall 16 and the glass fiber reinforcement in the side walls 18 is continuous between the end walls 16. This shell may be shaped manually over a suitable form, or it may be pressed into shape between dies, or it may be shaped by any other suitable means. A slight heat may be applied to soften the uncured resin to a tacky, readily formable state for this operation.

FIGURE 3 illustrates a similar shell 20 formed from a suitable blank, not shown, in the same manner in which the shell 13 of FIGURE 2 is formed. In the shell 20, the glass fiber reinforcement is continuous from one side wall 22 across the base 24 to the opposite side wall 22 and is continuous along each end wall 26 between the opposite side walls 22. For reasons which will become more apparent in the following, the shell 20 has beveled corners 28 and is provided with a flange 30 along the upper margins thereof. The dimensions of the shells 13 and 20 are such that the shell 20 may be projected into the shell 13 to form a container-like article having hollow wall portions and a hollow base portion.

In the practice of this invention, the hollow walls and base of the container-like member formed by the shells 13 and 20 are filled with a substantially isotropic filler derived from the same sheet stock utilized in forming the shells 13 and 20. The filler is obtained by cutting a quantity of the sheet stock into chips as illustrated at 32 in FIGURE 5. These chips may be rectangular or of any other arbitrary shape, the primary object in preparing the chips being to sever the continuous glass fibers in the sheet stock to short discrete glass fiber lengths.

FIGURE 5 illustrates the method by which a container is formed with the shells 13 and 20 and the chips 32. Illustrated in FIGURE 5 is a compression mold including a female member 36 adapted to telescopically receive a male member 34. In charging the mold, the shell 13 is seated in the female member 36, the shell 13 being dimensioned to fit snugly within this member. A predetermined mass of chips 32 is then deposited in the shell 13, the chips 32 being preferably randomly oriented. Finally, the shell 20 which is dimensioned to snugly fit the male member 34 is positioned on this member.

With the mold charged as illustrated in FIGURE 5, the male and female mold members are brought into pressured relation while simultaneously heat is applied to the mold by conventional means not illustrated. Sufficient heat is applied to polymerize the resin within the mold. The pressure required will depend upon the type of resin used and the shape of the object molded. Where polyester or phenolic resins of the type disclosed in my aforesaid copending application are employed in the practice of the present invention, a mold temperature in the range of 300° F. is required to polymerize the resin and where the object is a simple container as illustrated in the drawings a mold pressure in the range 200–500 pounds per square inch is found suitable.

Under the application of heat and pressure, the resin in the chips 32 softens to a free flowing state and flows to all parts of the hollow formed between the shells 13 and 20 carrying with it the short glass fiber lengths in the chips 32. This distributes the glass fiber reinforcement in the chips 32 uniformly throughout the hollow between the shells 13 and 20 while at the same time orienting the glass fiber reinforcement in a random manner. The mass of chips 32 used is calculated to just fill the hollow between the shells 13 and 20.

Due to the absence of any filler between the side walls and end walls of the shells 13 and 20 at the initiation of the molding process, the side walls and end walls of these shells will tend to buckle upon softening as heat is initially applied. However, as the chips 32 soften to a flowing state the hydraulic flow of resin and fibers between the side walls and end walls of the shells 13 and 20 will straighten these portions of the shells to substantially their original shape.

The resultant molded product is a container 40 which, by way of example, may serve as a carrier for milk bottles. This container is illustrated in FIGURE 4 of the drawings. While not illustrated, suitable slots or handles may be provided in the end walls of the container to facilitate carriage of the container.

As illustrated in FIGURE 4, the container 40 comprises an inner body portion 42 reinforced with randomly oriented glass fibers so as to have substantially isotropic structural strength and an outer encapsulating shell 44 bonded to the body portion providing continuous glass fiber reinforcement from one end to the other on the outside surface of the container, and providing continuous glass fiber reinforcement from one side to the other on the inside surface of the container. The arrangement is such that the base and the upright walls of the container are each provided with parallel glass fiber reinforcement in two directions oriented 90° apart on the opposite surfaces thereof. This continuous parallel glass fiber reinforcement on the surfaces of the container imparts high tensile strength to the container so that it may be used for lifting and carrying loads which are very large in comparison to the weight of the container. The substantially isotropic filler for the container provides good compression strength such that loaded containers may be stacked one upon the other without collapse of the container walls.

In this respect it is to be noted that the inner corners of the container 40 are beveled and that the corners of the shell 20 used in forming the container 40 are beveled in a complementary manner so as to provide comparatively thick columns in the corners of the container, these columns being a part of the inner isotropic body portion. These columns give added compression strength to the container.

As a modification to the method for making the container as described hereinabove, it is found beneficial to partially polymerize the resin in the shells 13 and 20 before insertion in the mold of FIGURE 5 so that these shells will maintain their shape without buckling during the molding process, and will be sufficiently viscous that the softened resin and the glass fibers in the chips 32 will not seep through the reinforcing shells 13 and 20 during the molding process. To this end, the shells 13 and 20 may be pre-polymerized in individual heated molds similar to that illustrated in FIGURE 5 for a period of time which is short of the time required for complete polymerization. The extent of pre-polymerization required will depend on the shape and complexity of the article to be molded and the nature of the resin used. In the specific molding process illustrated in FIGURE 5, 75% pre-polymerization may be successfully employed. That is, the shells 13 and 20 may be subjected to polymerization temperatures for 75% of the time required for complete polymerization before assembly in the mold of FIGURE 5.

Through the use of pre-polymerized thermosetting reinforcing surface shells, the techniques described herein are made amenable to the use of transfer or injection molding of the chips 32 within the reinforcing shells, as well as compression molding.

While the present disclosure has been confined to the manufacture of a container and more particularly to the manufacture of a milk bottle carrier, it is to be understood that the techniques disclosed herein are applicable to the formation of containers of other shapes and to the formation of other types of molded plastic articles without departing from the scope of the present invention. It is also to be understood that the present invention contemplates the use of but a single reinforcing shell which may either be on the surface of the molded article or embedded within the body of the molded article.

Although the preferred embodiment of this invention has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A molded plastic container comprising a plastic body portion reinforced with randomly oriented fibers having a base and upright sidewalls so as to have the shape of a container, an outer surface layer having a base and upright side walls bonded to the exterior of said body portion, and an inner surface layer having a base and upright side walls bonded to the interior of said body portion, said inner and outer surface layers each comprising a layer of plastic reinforced with continuous substantially parallel fibers and each having fibers in the base thereof extending into side walls thereof, the continuous fibers in the base and side walls of said outer surface layer being oriented at right angles to the continuous fibers in the corresponding base and side walls of said inner surface layer.

2. The method of forming a reinforced three-dimensional hollow plastic article from substantially unpolymerized plastic sheet stock reinforced with continuous substantially parallel fibers, including the steps of cutting and bending a portion of said sheet stock to form a surface shell for said article, placing said shell in a mold having a cavity corresponding to the shape of the article to be formed, cutting a remaining portion of said sheet stock into chips, charging said mold with a quantity of said chips sufficient to fill said cavity in cooperation with said shell, and applying heat and pressure to completely polymerize the plastic material of said shell and of said chips in said mold, said application of heat and pressure causing said chips to soften and flow throughout the volume of said cavity not occupied by said shell and to bond directly to said shell.

3. The method according to claim 2, including the step of applying heat to said surface shell to partially polymerize the same before the step of applying heat and pressure to the surface shell in the presence of said chips.

4. The method of forming a plastic article from substantially unpolymerized plastic sheet stock having continuous fiber reinforcement including the steps of cutting and bending portions of said sheet stock to form an inner surface shell and an outer surface shell for said article, said shells being adapted to nest one into the other so as to substantially enclose a cavity therebetween, chopping a remaining portion of said sheet stock into chips, placing said outer surface shell into said mold, nesting said inner surface shell in said outer shell, placing a quantity of said chips between said inner and said outer surface shells sufficient to fill said cavity, and applying heat and pressure to completely polymerize the plastic material of said shells and said chips in said mold, the heat and pressure application causing said chips to soften and flow throughout said cavity to form a substantially isotropic filler bonded directly to said surface shells.

5. The method according to claim 4 including the step of applying heat to said inner and said outer surface shells to partially polymerize the same before said chips are placed therebetween.

6. The method according to claim 7, wherein said sheet stock comprises a plastic sheet reinforced with continuous substantially parallel glass fibers and including the step of preparing said inner and outer surface shells with the glass fiber reinforcement of one extending at right angles to the glass fiber reinforcement of the other in complementary portions thereof.

7. The method of making a reinforced three-dimensional hollow plastic article including the steps of cutting and bending portions of a substantially unpolymerized plastic sheet stock having continuous fiber reinforcement to form inner and outer shells having substantially the shape of the inner and outer surfaces of the articles to be made, said shells being adapted to nest one into the other so as to enclose a cavity therebetween, nesting said shells in a mold, cutting a sheet of compatible unpolymerized plastic reinforced with continuous fibers into chips, interposing between said shells a quantity of said chips sufficient to fill said cavity, and applying heat and pressure to said mold to completely polymerize the plastic material of said shells and of said chips to a unitary predetermined shape, said heat and pressure application causing said chips to flow throughout said cavity and bond directly to said shells.

8. The method according to claim 7 including the step of partially polymerizing said shells before the reinforced plastic chips are interposed therebetween.

References Cited in the file of this patent

UNITED STATES PATENTS

| | | |
|---|---|---|
| 2,428,654 | Collins | Oct. 7, 1947 |
| 2,552,124 | Tallman | May 8, 1951 |
| 2,577,205 | Meyer et al. | Dec. 4, 1951 |
| 2,613,397 | Borkland | Oct. 14, 1952 |
| 2,718,583 | Noland et al. | Sept. 20, 1955 |
| 2,731,376 | Rusch | Jan. 17, 1956 |
| 3,802,766 | Leverenz | Aug. 13, 1957 |
| 2,832,995 | McCaw | May 6, 1958 |
| 3,018,210 | Frieder et al. | Jan. 23, 1962 |

FOREIGN PATENTS

| | | |
|---|---|---|
| 567,842 | Great Britain | Mar. 6, 1945 |
| 205,327 | Australia | Jan. 7, 1957 |